(12) United States Patent
Hussaini et al.

(10) Patent No.: US 7,207,469 B2
(45) Date of Patent: Apr. 24, 2007

(54) MOUNTING SYSTEM FOR AUDIO VISUAL EQUIPMENT

(75) Inventors: Saied Hussaini, Miami, FL (US); Marc Iacovelli, Miami, FL (US)

(73) Assignee: Intec, Inc., Miami, FL (US)

( * ) Notice: Subject to any disclaimer, the term of this patent is extended or adjusted under 35 U.S.C. 154(b) by 236 days.

(21) Appl. No.: 10/673,632

(22) Filed: Sep. 30, 2003

(65) Prior Publication Data

US 2005/0067451 A1    Mar. 31, 2005

(51) Int. Cl.
*B06R 7/00* (2006.01)
(52) U.S. Cl. .................. 224/275; 224/585; 224/929
(58) Field of Classification Search .............. 224/580, 224/579, 608, 648, 661, 250, 616, 275, 578, 224/584, 585, 929; 383/22; D12/416
See application file for complete search history.

(56) References Cited

U.S. PATENT DOCUMENTS

| 2,735,597 | A | * | 2/1956 | Treleven ................. 224/312 |
| 4,635,110 | A |   | 1/1987 | Weinblatt |
| 5,226,576 | A | * | 7/1993 | Ellsworth ................. 224/572 |
| 5,310,102 | A | * | 5/1994 | Hougham ................. 224/585 |
| 5,395,023 | A |   | 3/1995 | Naymark et al. |
| 5,437,367 | A | * | 8/1995 | Martin ................. 206/320 |
| 5,465,889 | A | * | 11/1995 | Smith ................. 224/677 |
| 5,842,715 | A | * | 12/1998 | Jones ................. 280/727 |
| 5,878,672 | A | * | 3/1999 | Ostermann et al. ......... 108/44 |
| D419,520 | S | * | 1/2000 | Bergh ................. D12/416 |
| 6,092,574 | A | * | 7/2000 | Krulik ................. 150/110 |
| 6,092,705 | A | * | 7/2000 | Meritt ................. 224/275 |
| 6,097,448 | A | * | 8/2000 | Perkins ................. 348/837 |
| D432,075 | S | * | 10/2000 | Hassett et al. ............ D12/416 |
| 6,149,042 | A | * | 11/2000 | Rassias ................. 224/661 |
| 6,216,927 | B1 |  | 4/2001 | Meritt |
| 6,393,745 | B1 |  | 5/2002 | Miki |
| 6,405,909 | B1 |  | 6/2002 | Burnett et al. |
| 6,662,985 | B2 | * | 12/2003 | Harada et al. ............. 224/661 |
| 6,685,016 | B2 | * | 2/2004 | Swaim et al. ............. 206/320 |
| 6,763,986 | B2 | * | 7/2004 | Santos et al. ............. 224/585 |
| 6,896,164 | B2 | * | 5/2005 | Fialla-Dori ............. 224/275 |
| 6,928,654 | B2 | * | 8/2005 | Tranchina et al. ........... 725/75 |
| 2001/0011664 | A1 |  | 8/2001 | Meritt |
| 2001/0039903 | A1 |  | 11/2001 | Patterson |
| 2002/0088726 | A1 |  | 7/2002 | Chou |
| 2002/0105507 | A1 |  | 8/2002 | Tranchina et al. |
| 2002/0136540 | A1 |  | 9/2002 | Adams et al. |
| 2003/0029755 | A1 |  | 2/2003 | Ho |

FOREIGN PATENT DOCUMENTS

EP    0 925 998 A3    6/1999

\* cited by examiner

*Primary Examiner*—Anthony D. Stashick
*Assistant Examiner*—Justin M. Larson
(74) *Attorney, Agent, or Firm*—Berenato, White & Stavish

(57) ABSTRACT

A mounting system for releasably securing a portable electronic device (Preferably a DVD entertainment device) within an automobile. A harness is designed to securely attach the portable electronic equipment to the back of an automobile seat. The harness includes a headrest strap that wraps around the upper portion of the seat, while a second strap wraps around the base of the vertical backrest portion of the seat and is connected to the housing at a third location. The harness is preferably limited to a three-point attachment between each end of the headrest strap and the housing, and a third connection between the housing and the base strap. A crossover strap may be employed to form an intermediate connection between the base strap and the housing.

5 Claims, 4 Drawing Sheets

MOUNTING SYSTEM FOR AUDIO VISUAL EQUIPMENT

BACKGROUND OF THE INVENTION

1. Field of the Invention

The invention relates to a mounting system for temporarily securing a portable electronic device in an automobile.

2. Description of the Related Art

Electronic equipment, such as digital video disc (DVD) players, has become increasingly lighter and more compact. The technology is currently available to enable DVD players and other electronic equipment, to be completely portable. To take advantage of these advances in technology, various portable electronics carrying systems have been developed. These systems include bags and cases for transport by individuals, and carrying systems for use in automobiles. Typical examples of backpack-type systems include: U.S. Pat. No. 6,393,745 to Miki; U.S. Patent Application Publications US 2003/0029755 to Ho; and US 2002/0088726 to Chou; each of which are hereby incorporated by reference. Typical examples of systems for automobiles include U.S. Patent Application US 2002/0105507 to Tranchina, and U.S. Pat. No. 6,097,448 to Perkins, U.S. Pat. No. 5,842,715 to Jones, and U.S. Pat. No. 5,395,023 to Naymark, US 2001/0011664 A1 to Meriot each of which are hereby incorporated by reference.

Although the prior art includes a wide variety of transport methods, the referenced systems are generally overly complex, and/or do not provide adequate support for the portable electronic equipment, particularly in an automobile. The present invention improves upon the drawback of the prior art providing a convenient mechanism to secure a portable electronic device to a vehicle seat without the necessity for connection to additional portions of the vehicle.

SUMMARY OF THE INVENTION

The invention includes a mounting system for securing a portable electronic equipment, preferably DVD player, to a seat. A harness is designed to securely attach a housing containing the portable electronic equipment to the back of an automobile seat. The harness comprises a headrest strap that wraps around the upper portion of the seat, while a second strap (the base strap) wraps around the base of the vertical backrest portion of the seat. A third strap, the crossover strap, may be employed to extend upward from the base strap and connect the base strap to the housing. The harness preferably has a three-point attachment system that includes first and second connections between each end of the headrest strap and the housing, and a third connection between the base strap and the housing.

DETAILED DESCRIPTION OF A PREFERRED EMBODIMENT

Figure 1:
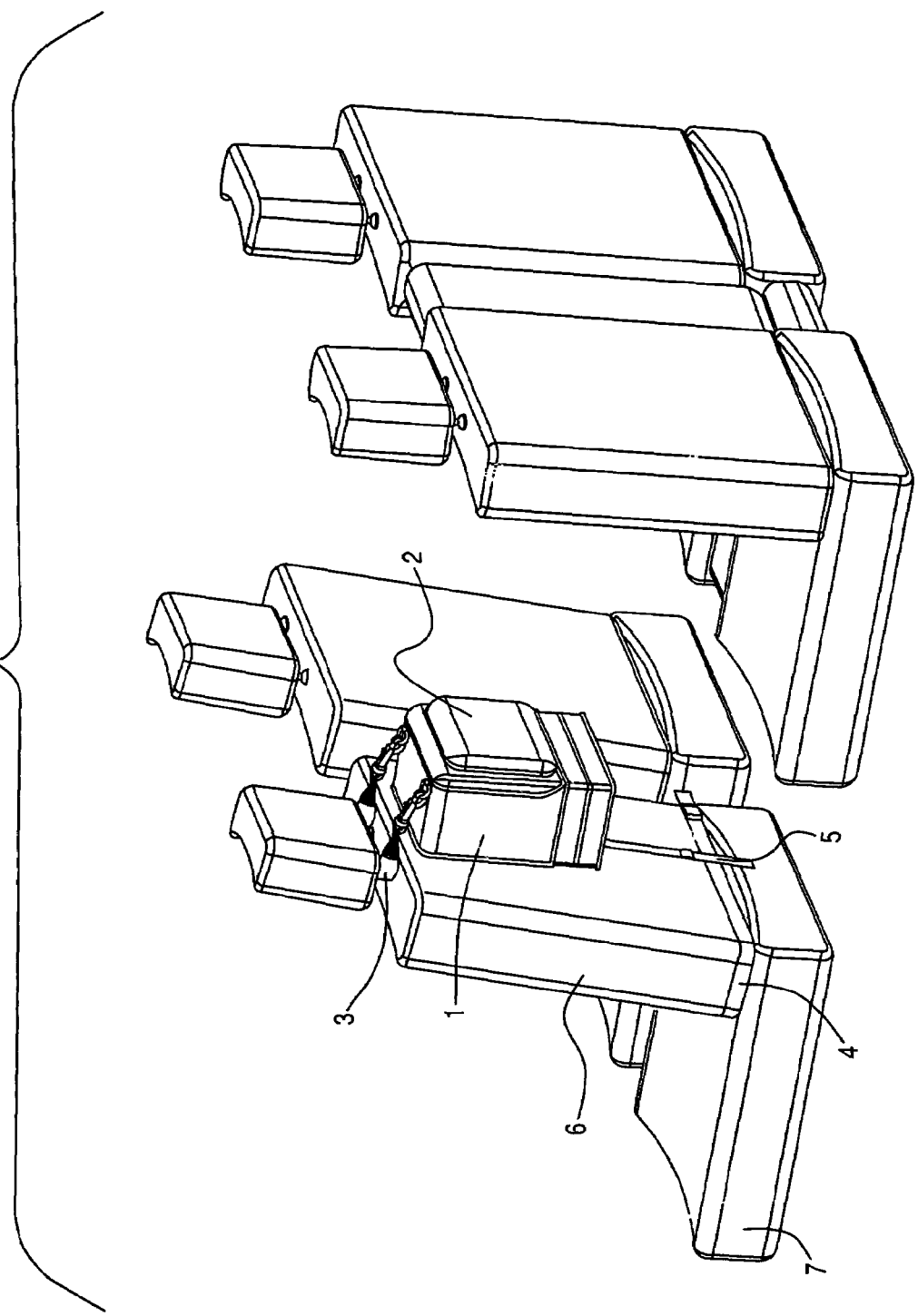
FIG. 1 is a rear perspective view of the invention secured to an automobile seat.
Figure 2:
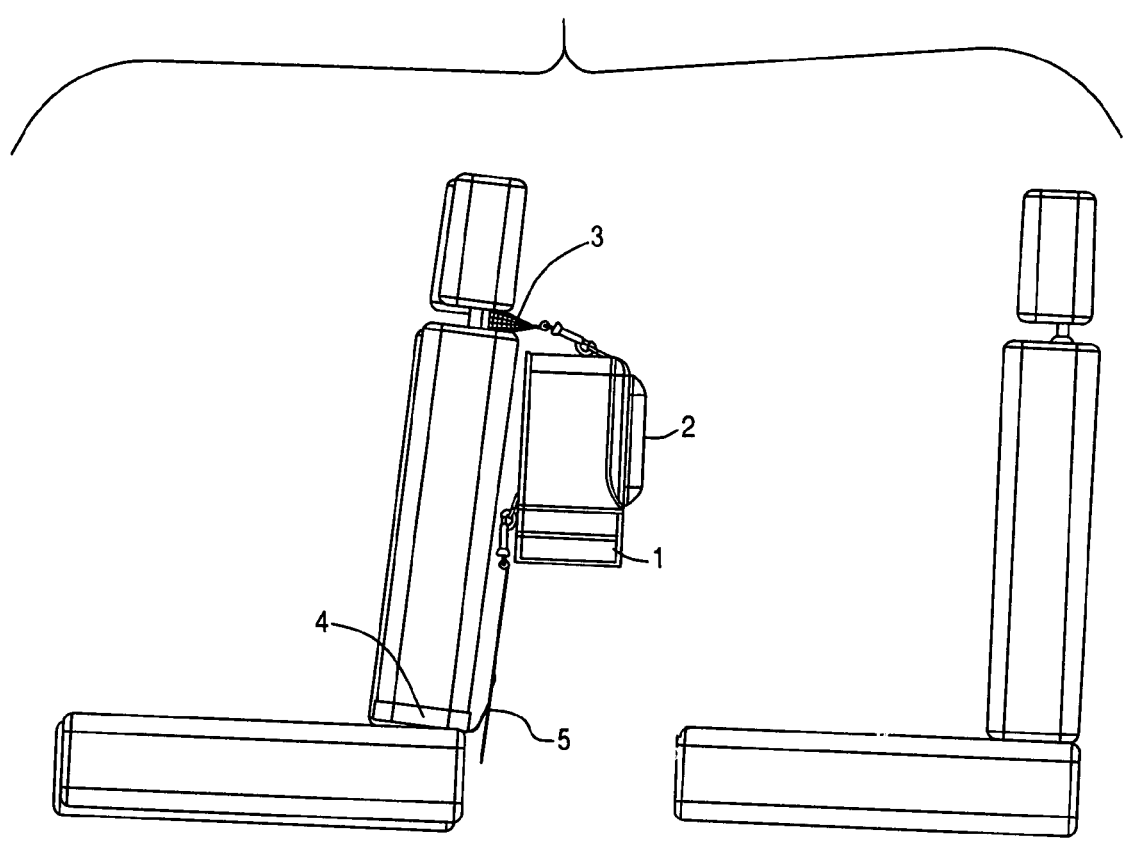
FIG. 2 is a side view of the invention depicted in FIG. 1.

FIGS. 1, and 2 disclose the present invention as installed on the seat of an automobile. The invention comprises a housing 1 for accessibly carrying a portable electronic device 2, preferably a portable DVD player to be viewed by a rear seated occupant. The housing 1 is secured to the automobile seat by a harness system. The harness system is includes a headrest strap 3, which secures the housing 1 to the upper portion of the seat, and a base strap 4, which encompasses the base of the vertical backrest portion 6 of the seat. The base strap 4 is connected to the housing 1, by a crossover strap 5. The crossover strap 5, maintains the housing 1 in a centered position, and ensures that the housing 1 is securely anchored to prevent relative motion between the seat and the portable electronic device 2.

Figure 3:
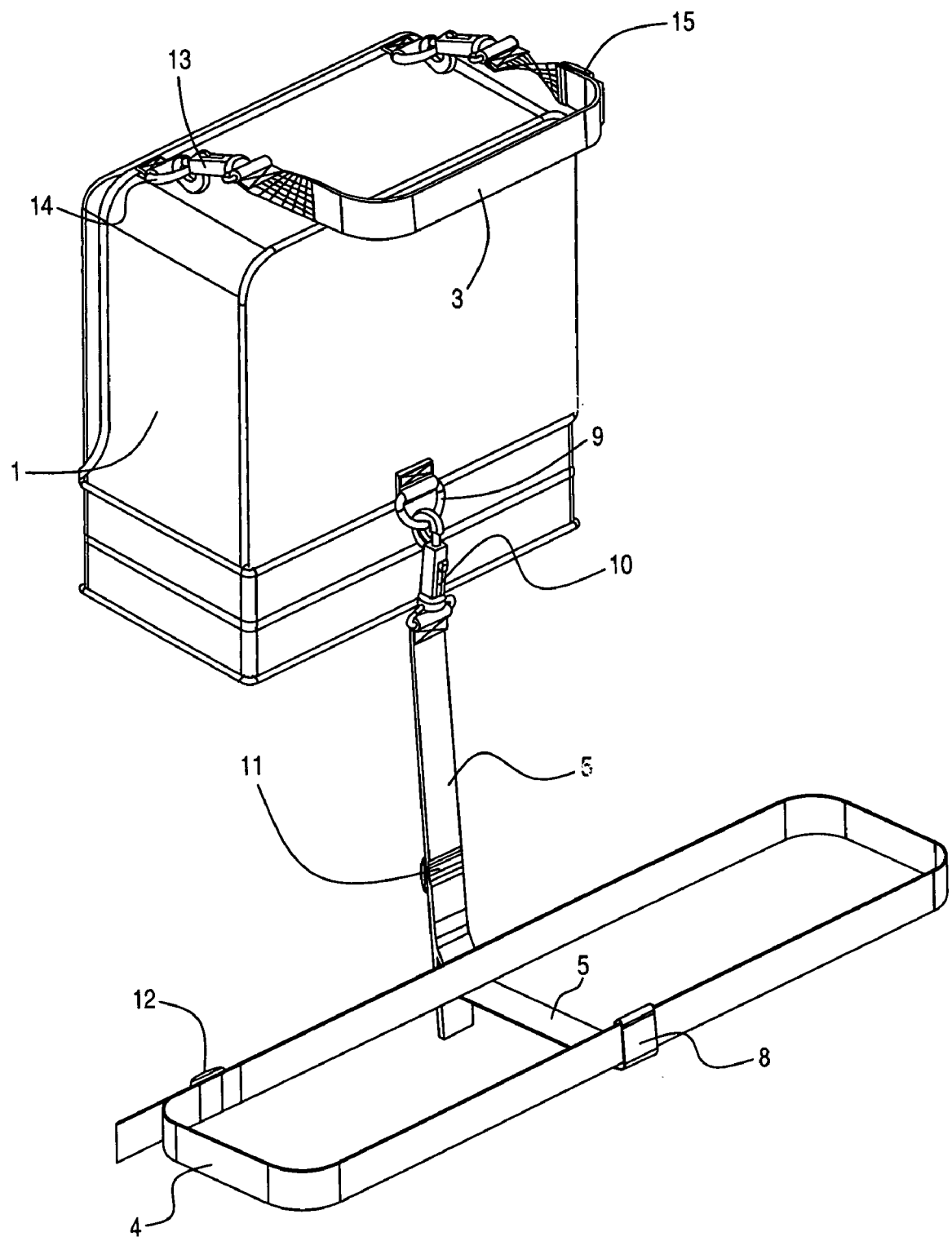
FIG. 3 is an isolated perspective view of the housing and associated straps according to the present invention.
Figure 4:
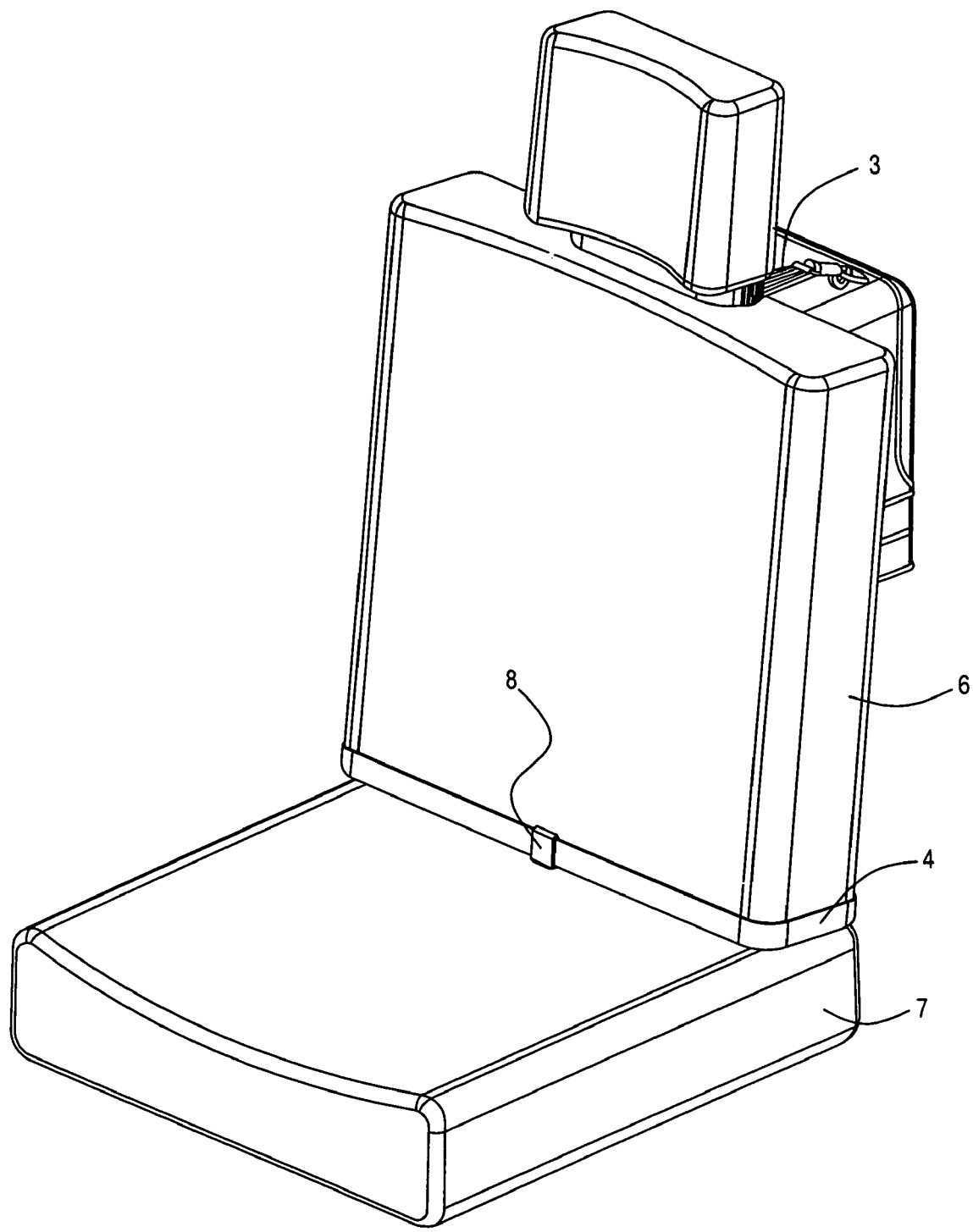
FIG. 4 is a front perspective view of the invention secured to a vehicle seat.

As best illustrated in FIGS. 3 and 4, the crossover strap 5 runs between the vertical backrest portion of the seat 6, and the horizontal bench portion 7, and is connected to the base strap 4, on the front side of the seat by a sliding strap loop 8. Such an arrangement prevents the base strap from riding upward once the straps are tightened to securely retain the housing 1. The sliding loop 8 allows the attachment between the crossover strap 5 and the base strap 4 to be adjusted to conform to the width of the seat. The sliding strap loop 8 also allows the crossover strap 5 to be positioned at any horizontal point on the base strap 4.

The opposite end of the crossover strap 4 is connected to the housing 1. The housing 1 includes connecting hardware that can be of any type known in the art, but is preferably a D-ring 9. The end of the crossover strap 4 designed to connect with the housing D-ring 9 has an appropriate linking connector, preferably a bolt snap connector 10. The bolt snap connector 10 hooks into the D-ring 9 to form a secure connection between the between the crossover strap 5 and the housing 1, while the crossover strap 5 functionally ensures a secure connection between the base strap 4 and the housing 1.

At the mid-point of the crossover strap 5, there is an adjustment mechanism 11, which allows the length of the crossover strap to be adjusted to conform to varying seat types. The headrest strap 3 includes a similar adjustment mechanism 15 that allows the length of the headrest strap 3 to be adjusted. One end of the base strap 4 also has an adjustment mechanism 12 that allows the length of the base strap to be adjusted. Although the adjustment mechanisms 11, 12, 15, may be of any type known in the art, they are preferably, slide buckle type mechanisms.

Similar to the attachment point between the crossover strap 5 and the housing 1, the connection system between the housing 1 and headrest strap 3 is also designed to be secure and convenient. The connection system may be of any type known in the art, but is preferably a D-ring and bolt snap system. As best shown in FIG. 3, the housing 1 has two D-ring-type connectors 13 positioned on the housing's 1 top surface, and the headrest strap 3 has two bolt snap connectors 14 disposed at each end of the strap. The bolt snap connectors 14 hook into the D-rings 13 to form a secure connection between the headrest strap 3, and the housing 1.

For the foregoing reasons, it is clear that the invention provides an improved system for firmly and efficiently securing a housing containing a portable electronic device to an interior component of an automobile. The invention comprises a three-point attachment system that allows the associated housing to be removed quickly and conveniently removed at any time.

Multiple variations and alternative embodiments are clearly apparent to one of ordinary skill in the art. For example, although only bucket-type seats are shown in the drawings, the base strap 4 may be lengthened to accommodate conventional bench-type seats. Similarly, the base strap 4 is described as encircling the base of the backrest 6, the base strap 4 may alternatively encircle the horizontal portion of the seat 7. Depending on the application, the base strap 4 or cross over strap 5 may be omitted and a single strap employed to directly connect the housing to the seat.

Similarly, the headrest strap 3 may be attached to the ceiling or another anchoring component functionally capable of supporting the housing 1. The headrest strap 3 may also encircle both headrests/upper seat portions (rather than just one), and the base strap 4 could encircle two individual seats, thereby positioning the housing 1 between the seats.

Although the invention has been primarily described as attaching a portable electronic device to an automobile seat, the invention may attach the portable electronic device to any type of seat, including stationary (non-vehicle) seats, airline seats, train seats, boat seats, etc.

Although the materials of construction have not been specifically described, they may include any type of material that can perform the function of the component as described. For example, the housing 1 may be comprised of a relatively soft material such as nylon, fabric, vinyl, leather, rubber, soft plastic, etc., or the housing 1 may be a hard case comprised of metal, fiberglass, hard plastic, or the like so long as it is suitable for accessibly housing the portable electronic device. Further, it is within the scope of the invention for there to be no conventional "housing" at all, if the portable electronic device has the connecting hardware incorporated into its design. The straps described in the invention may be elasticized or non-elasticized, and may be comprised of nylon, fabric, vinyl, leather, rubber, plastic, or any other material capable of performing the function. Similarly, as previously noted, the connection mechanisms and hardware may be of any type known in the art. While the foregoing invention has been shown and described with reference to a preferred embodiment, it will be understood by those possessing skill in the art that various changes and modifications may be made without departing from the spirit and scope of the invention.

I claim:

1. A mounting device for releasably securing a portable electronic device to a seat having a substantially vertical backrest portion and a base portion, said mounting device comprising:

a housing provided for accessibly retaining said portable electronic device, a headrest strap adapted for substantially encircling an upper portion of said substantially vertical backrest portion of said seat and connected to an upper portion of said housing, a base strap adapted for substantially encircling a lower portion of said backrest portion of said seat proximate said base portion and attached to a single point of a lower portion of said housing, wherein said headrest strap is attached to two discrete spaced apart points in said upper portion of said housing, wherein said housing has a maximum of three strap attachment points, and wherein said maximum of three attachment strap points each include a D-ring type connector to establish a connection between said housing and a corresponding one of said straps.

2. The mounting device as described in claim 1, wherein said headrest strap has a first and second end each having bolt snap-type connectors connected to a corresponding one of said D-ring connections.

3. The mounting device as described in claim 1, further comprising a cross over strap disposed between and interconnecting said housing to said base strap, wherein said crossover strap has a bolt snap connector connected to a corresponding one of said D-ring connections.

4. A mounting device for releasably securing a portable electronic device in combination with an automobile seat having a substantially vertical backrest portion and a base portion, said mounting device comprising:

a housing for accessibly retaining said portable electronic device;

a three-point connecting harness for holding said housing to a rearward facing surface of an automobile seat, said three-point connecting harness including:

a headrest strap encircling an upper portion of said substantially vertical portion of said automobile seat, said headrest strap having a first and second end attached at two discrete spaced apart locations disposed in an upper portion of said housing, a base strap encircling a portion of said backrest portion of said automobile seat adjacent said base portion of said automobile seat, and a crossover strap connecting said base strap to a third location disposed on a lower portion of said housing, wherein said crossover strap has a first and second end, said first end having a single point connection to a downward facing surface of said housing, said second end being formed into a sliding strap loop to form an adjustable connection to said base strap disposed along a forward facing surface of said automobile seat.

5. The combination described in claim 4, wherein said crossover strap extends between said substantially vertical backrest portion and a base portion.

* * * * *